(12) United States Patent
James

(10) Patent No.: US 11,337,379 B2
(45) Date of Patent: May 24, 2022

(54) PLANT GROWING APPARATUS

(71) Applicant: Tammy L. James, Broken Arrow, OK (US)

(72) Inventor: Tammy L. James, Broken Arrow, OK (US)

( * ) Notice: Subject to any disclaimer, the term of this patent is extended or adjusted under 35 U.S.C. 154(b) by 177 days.

(21) Appl. No.: 16/397,680

(22) Filed: Apr. 29, 2019

(65) Prior Publication Data
US 2020/0337251 A1 Oct. 29, 2020

(51) Int. Cl.
*A01G 9/24* (2006.01)
*A01G 9/26* (2006.01)

(52) U.S. Cl.
CPC .............. *A01G 9/243* (2013.01); *A01G 9/26* (2013.01); *A01G 9/247* (2013.01); *A01G 9/249* (2019.05)

(58) Field of Classification Search
CPC ....................................................... F24S 40/20
See application file for complete search history.

(56) References Cited

U.S. PATENT DOCUMENTS

| | | | |
|---|---|---|---|
| 4,195,441 A * | 4/1980 | Baldwin | A01G 9/243 47/17 |
| 4,242,833 A * | 1/1981 | Maes, Jr. | A01G 9/243 47/17 |
| 4,527,544 A * | 7/1985 | Wolf | F24S 80/60 126/605 |
| 4,671,011 A * | 6/1987 | Jantzen | A01G 9/20 428/34.1 |
| 5,101,593 A * | 4/1992 | Bhatt | A01G 9/16 47/17 |
| 8,407,935 B1 * | 4/2013 | Colless | A01G 31/02 47/66.6 |
| 8,939,607 B2 * | 1/2015 | Casper | A01G 9/243 362/241 |
| 10,667,468 B1 * | 6/2020 | Tang | H05B 45/12 |
| 2005/0076563 A1 * | 4/2005 | Faris | A01G 9/243 47/58.1 LS |
| 2005/0091916 A1 * | 5/2005 | Faris | A01G 25/00 47/39 |
| 2006/0198152 A1 * | 9/2006 | Wechsler | A01K 63/06 362/382 |
| 2008/0092442 A1 * | 4/2008 | Singer | A01G 9/20 47/66.1 |

(Continued)

*Primary Examiner* — Peter M Poon
*Assistant Examiner* — Shada Mohamed Alghailani
(74) *Attorney, Agent, or Firm* — Dale J. Ream

(57) ABSTRACT

A plant growing apparatus is disclosed that enables users to grow edible vegetation and other plants in all climates and year round. The plant growing apparatus includes a framework, a solar assembly coupled to said framework at a predetermined angle, the solar assembly including at least one photovoltaic panel operable to receive solar energy. A planting bed is coupled to said framework. A lighting assembly is connected to the photovoltaic panel and operably directed to emit light toward said planting bed. The plant growing apparatus includes a watering assembly having a misting conduit in fluid communication with a water source and positioned proximate the photovoltaic panel and defining an aperture and a wiper assembly operably coupled to said at least one photovoltaic panel, said wiper assembly including a pulley system and a wiper blade movable along the photovoltaic panel when said pulley system is actuated.

8 Claims, 15 Drawing Sheets

(56) References Cited

U.S. PATENT DOCUMENTS

| | | | |
|---|---|---|---|
| 2008/0128095 A1* | 6/2008 | Van Zutven | A01G 9/22 160/22 |
| 2010/0229916 A1* | 9/2010 | Bechamp | F24S 40/20 136/244 |
| 2011/0005128 A1* | 1/2011 | Chuang | F24S 20/67 47/17 |
| 2011/0303215 A1* | 12/2011 | Chuang | A01G 9/243 126/623 |
| 2012/0174478 A1* | 7/2012 | Chen | H02S 20/23 47/17 |
| 2012/0291767 A1* | 11/2012 | Spear | F24D 11/00 126/617 |
| 2016/0262323 A1* | 9/2016 | Iwai | A01G 7/045 |
| 2016/0324077 A1* | 11/2016 | Frantzen | H02S 10/40 |
| 2016/0360712 A1* | 12/2016 | Yorio | A01G 9/249 |
| 2017/0006785 A1* | 1/2017 | May | A01G 9/16 |
| 2017/0070189 A1* | 3/2017 | Hartman | B08B 3/024 |
| 2017/0223904 A1* | 8/2017 | Raccanello | A01G 9/00 |
| 2018/0368336 A1* | 12/2018 | Erickson | A01G 9/246 |
| 2019/0089292 A1* | 3/2019 | Wang | H02S 20/30 |
| 2019/0166770 A1* | 6/2019 | Spiro | A01G 9/025 |
| 2019/0166771 A1* | 6/2019 | Spiro | A01G 27/005 |
| 2019/0327912 A1* | 10/2019 | Tanner | A01G 9/243 |
| 2019/0364741 A1* | 12/2019 | Erickson | A01G 9/18 |
| 2019/0372513 A1* | 12/2019 | Gross | H02S 20/32 |
| 2020/0253133 A1* | 8/2020 | Lewis | A01G 31/06 |
| 2020/0359572 A1* | 11/2020 | Henson | H02J 13/00002 |

* cited by examiner

PLANT GROWING APPARATUS

REFERENCE TO RELATED APPLICATION

This application is related to U.S. application 62/383,788 filed Sep. 6, 2016, and titled, SOLAR POWERED GROW FARM.

BACKGROUND OF THE INVENTION

The present invention pertains generally to a plant growing apparatus for growing plants and, more particularly, to a photovoltaic powered greenhouse.

Growing and cultivating plants is both a common hobby and a worldwide industry. Plants require water, light, and a temperature controlled growing environment. Typically, a seedling or other plant that is not ready to be placed into a natural environment needs to be protected. Gardeners may use a greenhouse, cold frame, hothouse, or other similar protective enclosure, depending on the plant variety, to shelter and nurture their delicate plants. Additionally, they then need to provide a light source to meet the specific lighting requirements of the chosen crop of vegetation. A solution that encompasses the growing requirements of a wide variety of plants in a single unit that produces its own light is needed. Various devices known in the art provide some of the needed components described above but, while presumably effective for their respective purposes, insufficient to meet the objectives of the present invention.

Therefore, it would be desirable to have a protective plant growing apparatus (i.e. a grow farm) for growing a variety of plants in a variety of environments. The plant growing apparatus utilizes solar powered light panels to convert sunlight to electricity—some of which may be used to power grow lights for the plants. The structure incorporates a grow bed for containing the plants and a planting media. Users simply plant whatever flora they desire in the plant growing apparatus and place the unit in sunlight. Surplus energy produced by the solar powered light panels may be saved for later or may be used for other applications.

SUMMARY OF THE INVENTION

A plant growing apparatus according to the present invention is disclosed that enables users to grow edible vegetation and other plants in all climates and year round. The plant growing apparatus includes a framework, a solar assembly coupled to said framework at a predetermined angle, the solar assembly including at least one photovoltaic panel operable to receive solar energy. A planting bed is coupled to said framework. A lighting assembly is connected to the photovoltaic panel and operably directed to emit light toward said planting bed. The plant growing apparatus includes a watering assembly having a misting conduit in fluid communication with a water source and positioned proximate the photovoltaic panel and defining an aperture and a wiper assembly operably coupled to said at least one photovoltaic panel, said wiper assembly including a pulley system and a wiper blade movable along the photovoltaic panel when said pulley system is actuated.

Therefore, a general object of this invention is to provide a plant growing apparatus for growing a variety of plants in a variety of environments.

Another object of this invention is to provide a plant growing apparatus, as aforesaid, having at least one photovoltaic cell for harvesting solar energy for the purpose of energizing the plant growing apparatus.

Still another object of this invention is to provide a plant growing apparatus, as aforesaid, having a misting device for keeping the photovoltaic panel cool or, alternatively, simply to direct water to the plant bed.

Yet another object of this invention is to provide a plant growing apparatus, as aforesaid, that includes a wiper assembly that acts to squeegee or absorb moisture that may accumulate on the photovoltaic panel, the water being directed to the plant bed.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
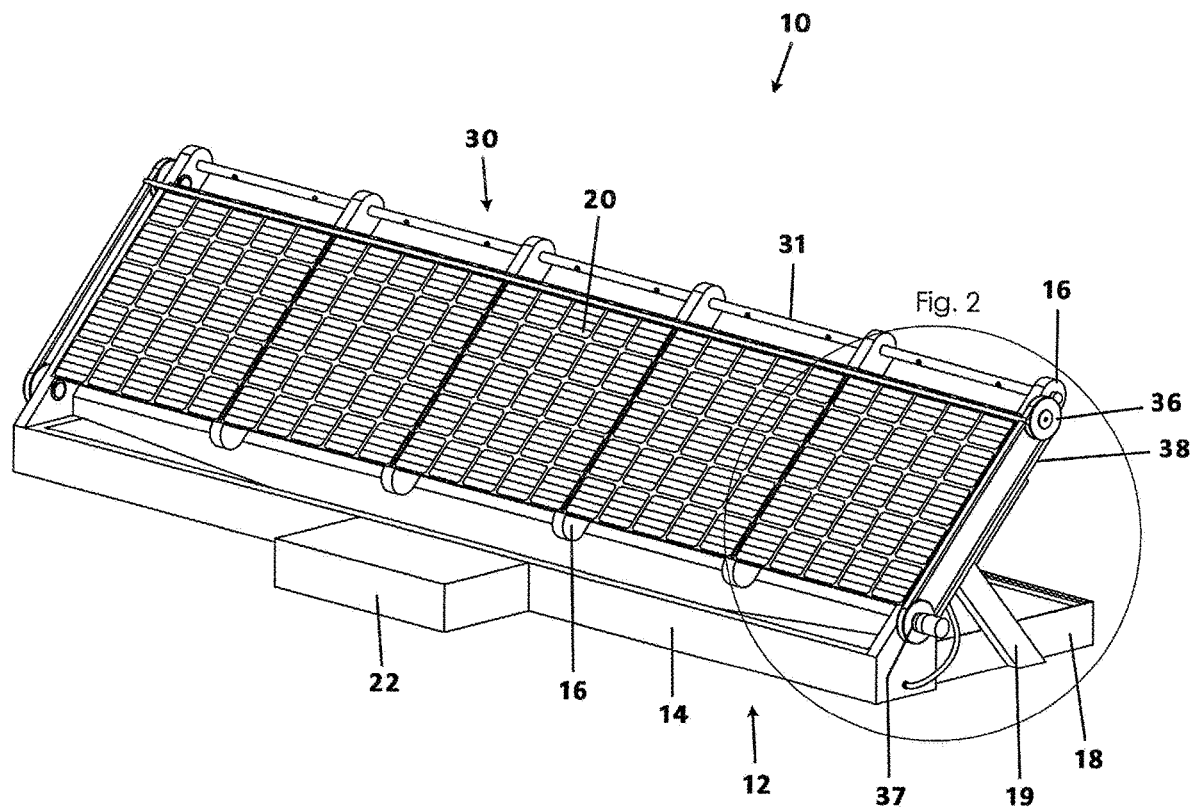
FIG. 1 is a front perspective view of a plant growing apparatus according to a preferred embodiment of the present invention.
Figure 2:
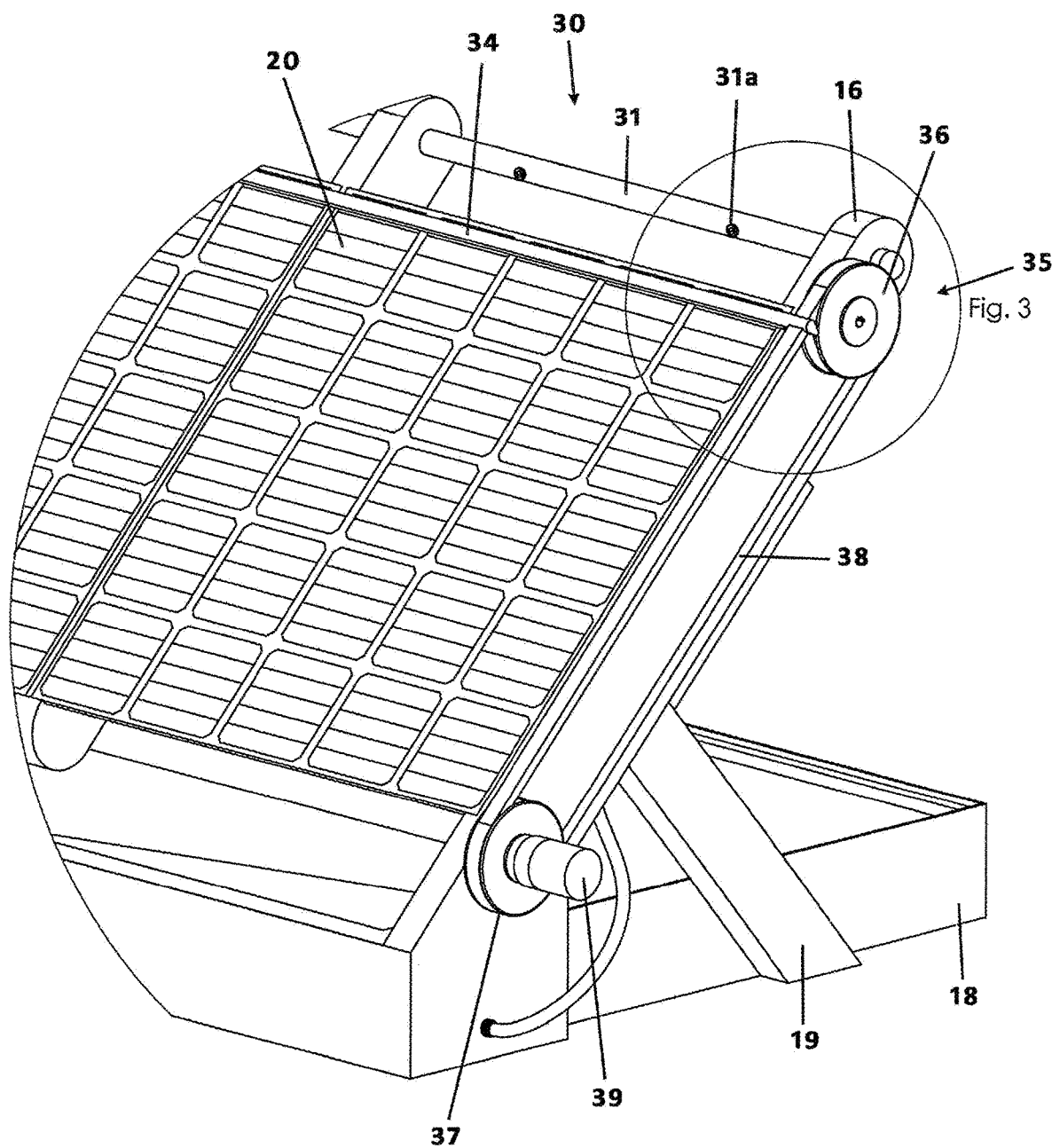
FIG. 2 is an isolated view on an enlarged scale taken from FIG. 1.
Figure 3:
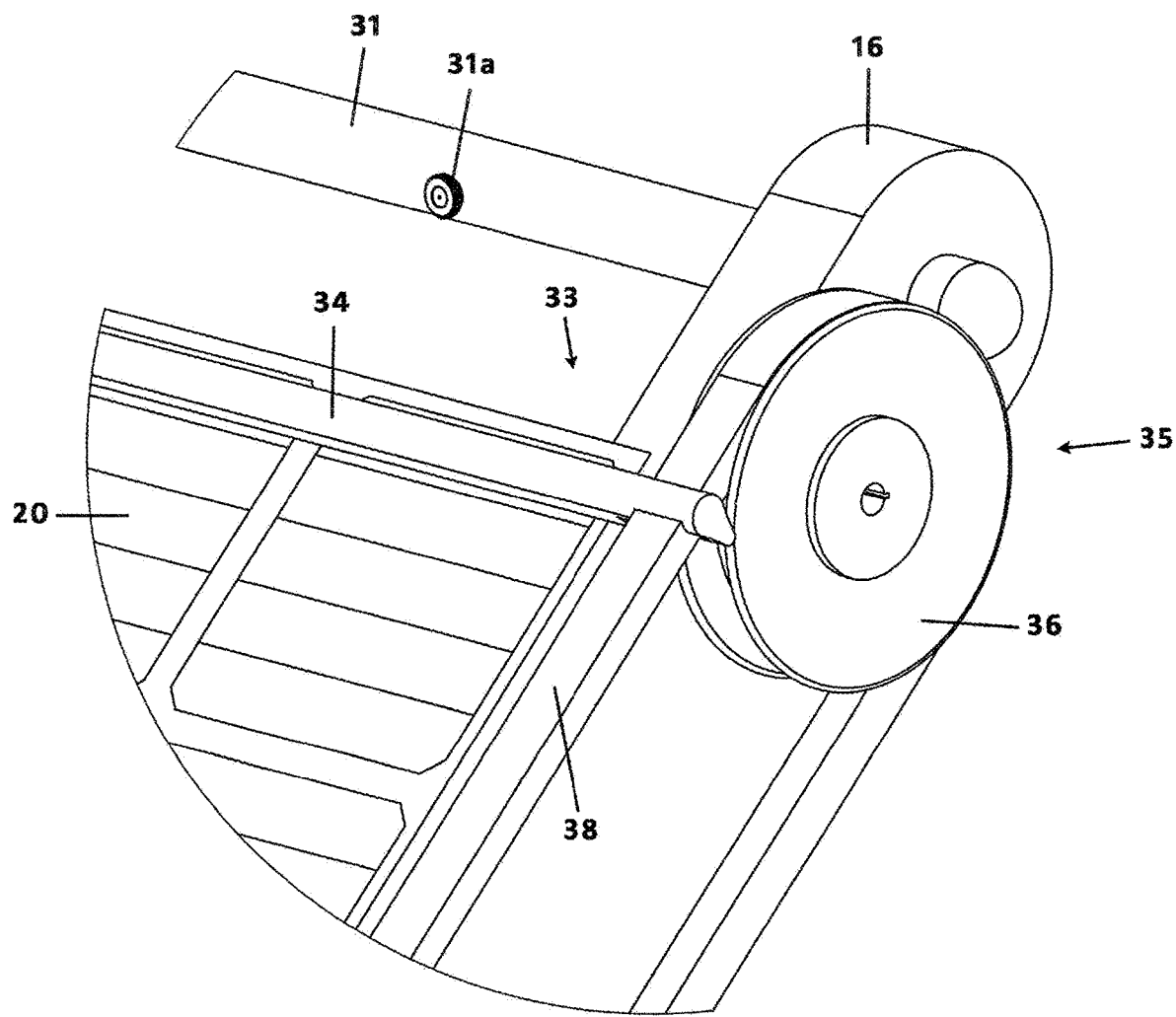
FIG. 3 is an isolated view on an enlarged scale taken from FIG. 2.
Figure 4:
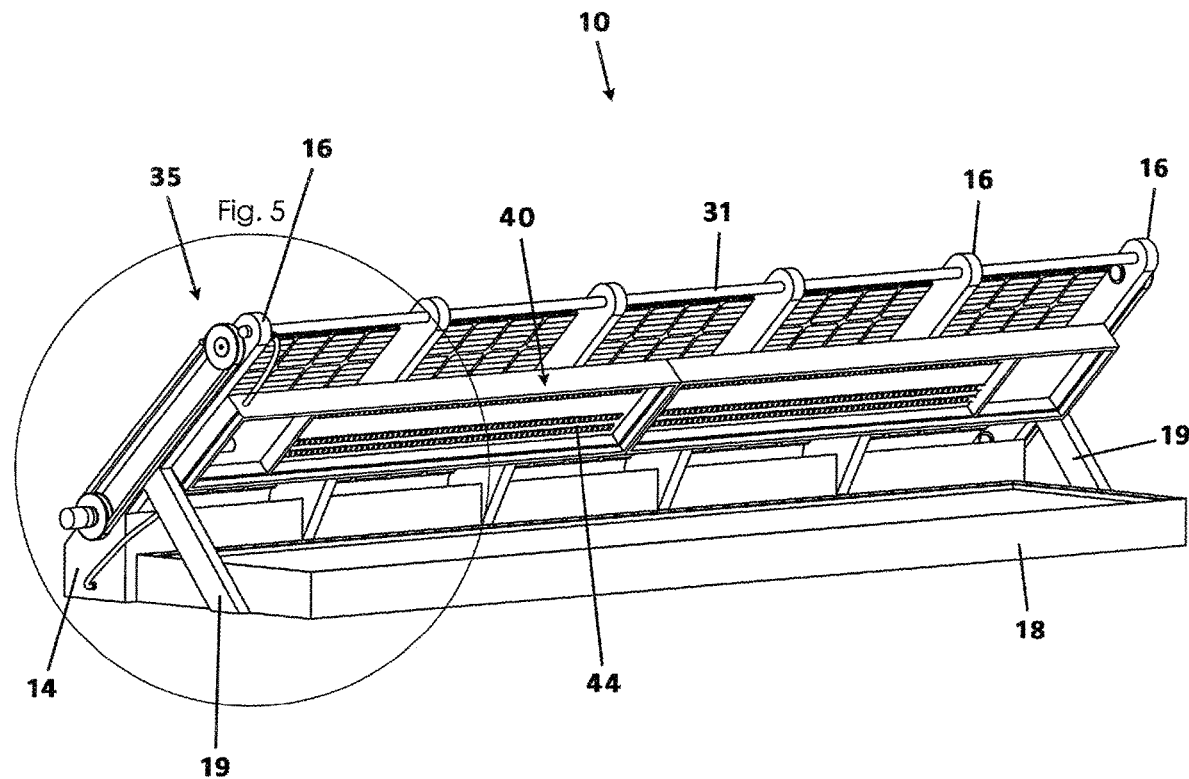
FIG. 4 is a rear perspective view of the plant growing apparatus as in FIG. 1.
Figure 5A:
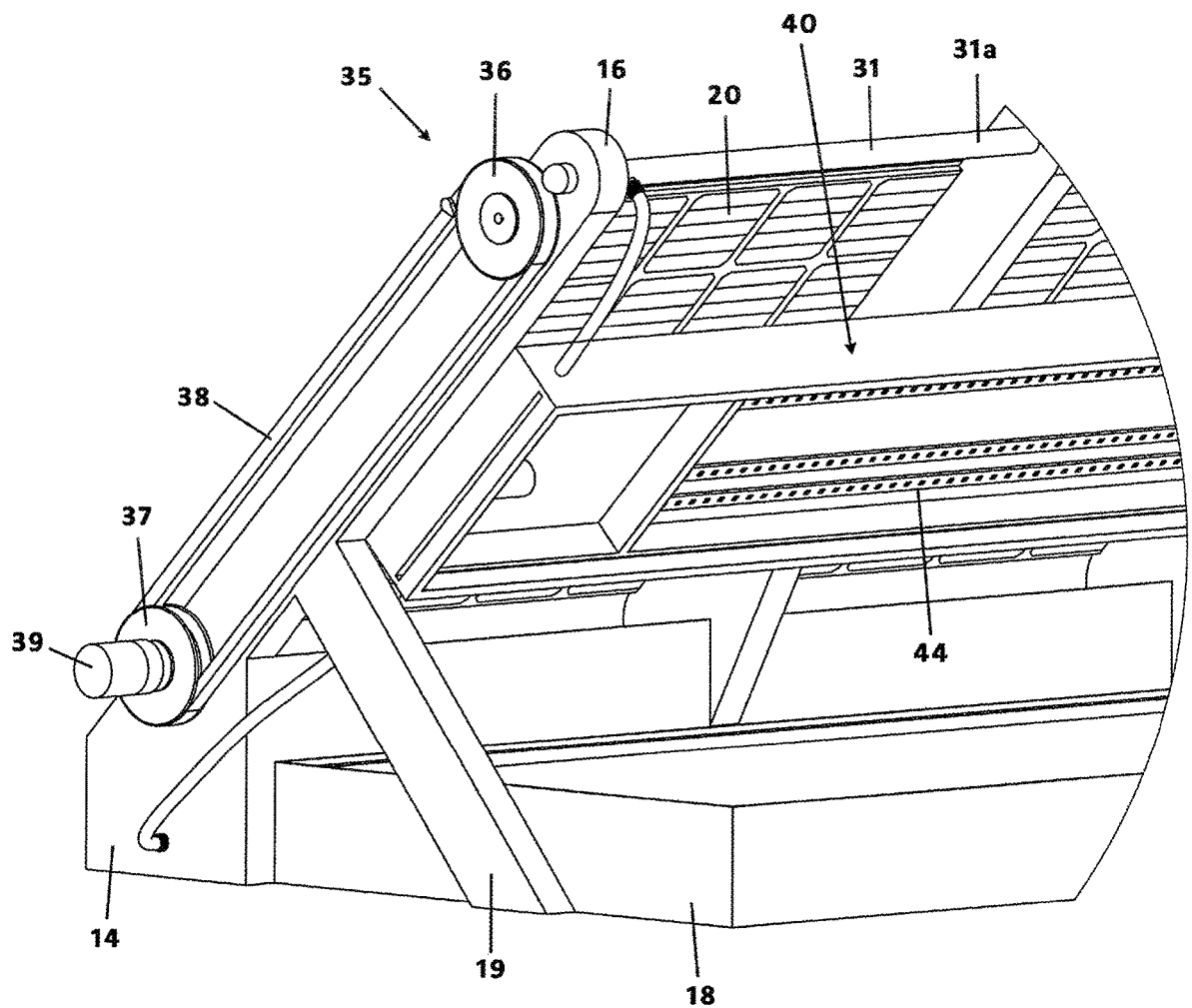
FIG. 5A is an isolated view on an enlarged scale taken from FIG. 4 illustrating a light cover in a closed configuration.
Figure 5B:
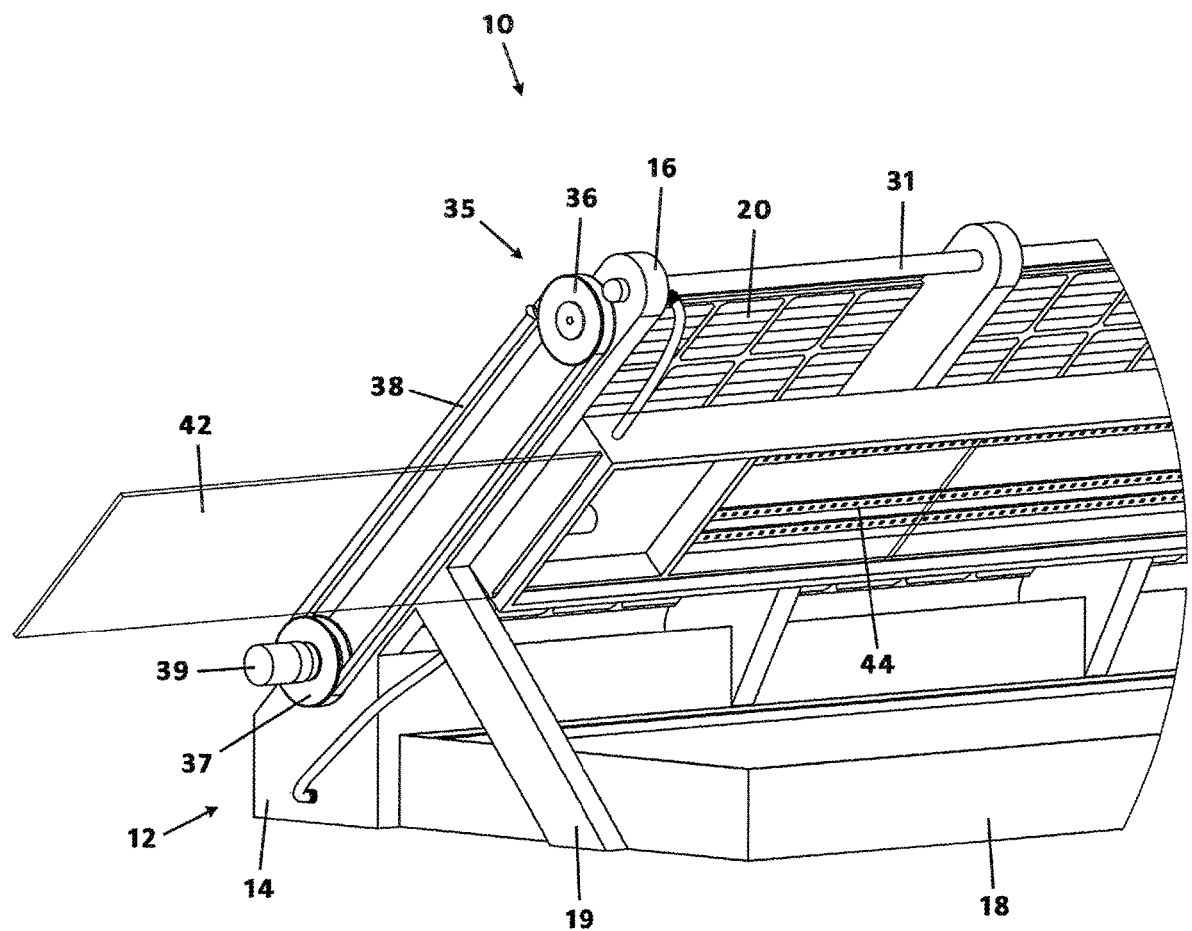
FIG. 5B is an isolated view on an enlarged scale taken from FIG. 4 illustrating a light cover in a open or removed configuration.

A protective grow farm according to a preferred embodiment of the present invention will now be described in detail with reference to FIGS. 1 to 14 of the accompanying drawings. The protective grow farm 10, which also be referred to as a grow farm apparatus 10, includes at least one photovoltaic panel 20 supported by a framework 12, a watering assembly 30, a misting conduit 31, and a lighting assembly electrically connected to said at least one photovoltaic panel 20 and operably directed to emit light toward said planting bed 18.

The present invention provides a plant growing apparatus 10 for growing plants under photovoltaic panels 20 in solar farms or anywhere photovoltaic panels are useable. The plant growing apparatus 10 allows a user to grow plants where space is limited, such as the unused space under the panels in a solar farm. The invention allows plants to grow in harsh growing conditions and in all climates: hot, cold, arid, and wet. The plant growing apparatus 10 functions as a grow house to jump start plants and seedlings within a protected environment and facilitates both day and night plant growing. Additionally, the invention include a cool off system for over-heating solar panels and increases the lifespan of the solar batteries.

Referring initially to the drawings, FIG. 1 illustrates a plant growing apparatus 10 for use in growing plants. The plant growing apparatus 10 include at least one photovoltaic panel 20 (i.e. solar panel), an environmental system and a planting bed 18. The photovoltaic panel 20 (PV panel) preferably includes a plurality of solar cells used for converting sunlight into electricity. The PV panel may be constructed in any manner or size as is known to one of skill in the art. In some embodiments, the solar cell may be manufactured from polymers, plastics, or other organic materials. Phosphoric acid may be utilized to enhance conductivity. Each solar cell may be wired independently so that the PV panel will still work when not in direct sunlight or if an individual cell is broken. Polymer cells may be printed directly on a non-toxic, thin, renewable carbon based plastic foil if desired.

While not meant as a limitation, one embodiment of the PV panel may be a low cost LG NeON 2 315 W Solar Panel LG315N1C-G4 with approximately 19.2 percent efficiency and a nominal voltage of 20V. This embodiment comprises a double sided mono-crystalline cell structure with the following characteristics: 6000 pa front load and 5400 pa rear load durability; approximately 83.6 percent output —6 mods min; a 156.75 mm square cell dimension; 64.75 in length by 39.37 inches wide; peak powers of 315 W, 33.2V, 9.5 A, an open circuit voltage of 40.6V, a short circuit current of 10.02 A, a maximum system voltage of 600 VDC; and a weight of approximately 37.5 lb.

A PV panel 20 is generally attachable to one side of the planting bed 18 and is typically oriented at an approximately 45 degree angle upward. The planting bed 18 is dimensioned comparably to the size of the PV panel 20 and includes a base and four sides. While the planting bed 18 may be constructed of any material, in one embodiment it may be manufactured from wood. The wood acts well to absorb excess condensation from the surrounding environment and protects any internal electrical components better than metal. Wood and/or plastic is desirable as the material for longevity, cost, and lack of maintenance requirements. Wood is also a good insulator and doesn't hold the sun's heat like metal and plastic. Further, the planting bed 18 may be constructed using aluminum insulate base products or, at least, the planting bed 18 may be surrounded with insulate products and pesticide prevention material that is totally organic. This construction and assembly enhances the efficiency of the apparatus.

Figure 13:
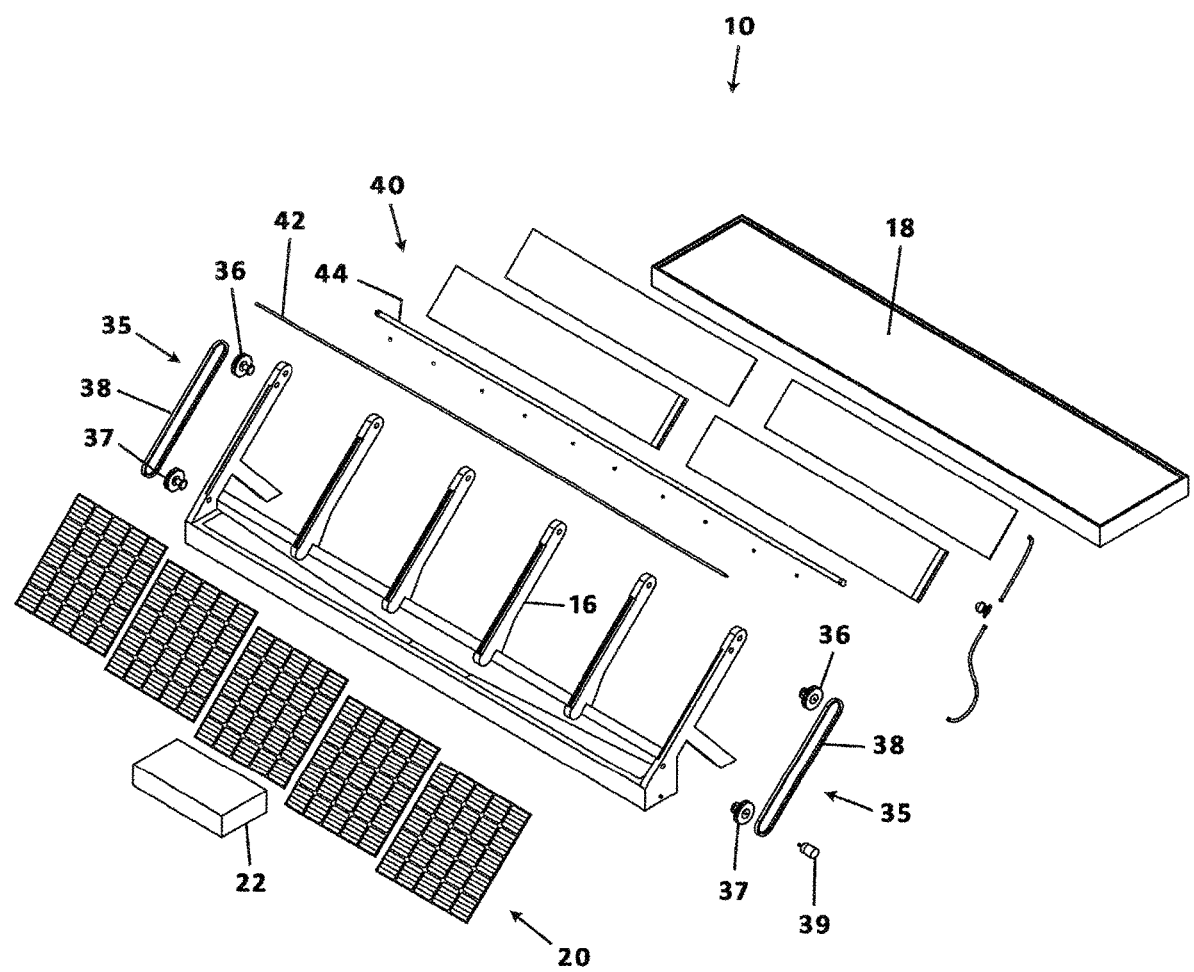
FIG. 13 is an exploded view of the plant growing apparatus as in FIG. 1.

Each photovoltaic panel 20 may be coupled to and supported by the framework 12. More particularly, the framework 12 includes multiple components arranged for supporting the plurality of photovoltaic panels 20. For instance the framework 12 may include a mounting member 14 that has an elongate and generally linear configuration that may be positioned and laid along a ground surface (FIGS. 1 and 13). Further, the framework 12 may include a plurality of support members 16 that are spaced apart from one another and extend away from the mounting member 14 at an angle, such as at a predetermined angle. Each PV panel 20 may be coupled to adjacent support members. Still further, the framework 12 may include at least at pair of auxiliary members 19 with each auxiliary member 19 being coupled to an outermost support member of the plurality of support members 16, respectively. Each auxiliary member 19 is positioned at an angle different than the predetermined angle of the plurality of support members 16 and may be positioned adjacent respective ends of the planting bed 18.

The environmental system of the plant growing apparatus 10 includes the lighting assembly 40. The lighting assembly 40 functions as a grow light that is attached to an underside of the one or more PV panels 20. The lighting assembly 40 may comprise interchangeable light coloring panels 44 producing light of any wavelength. This is beneficial as different plants have different light requirements. Additionally, any type of bulb such as fluorescent, LED, etc may be used. The environmental system may further comprise a magnification element (not shown) to reflect the light outward to continually charge the PV panels at night. Therefore, an unused portion of the light energy may be returned to the charging system.

Figure 6:
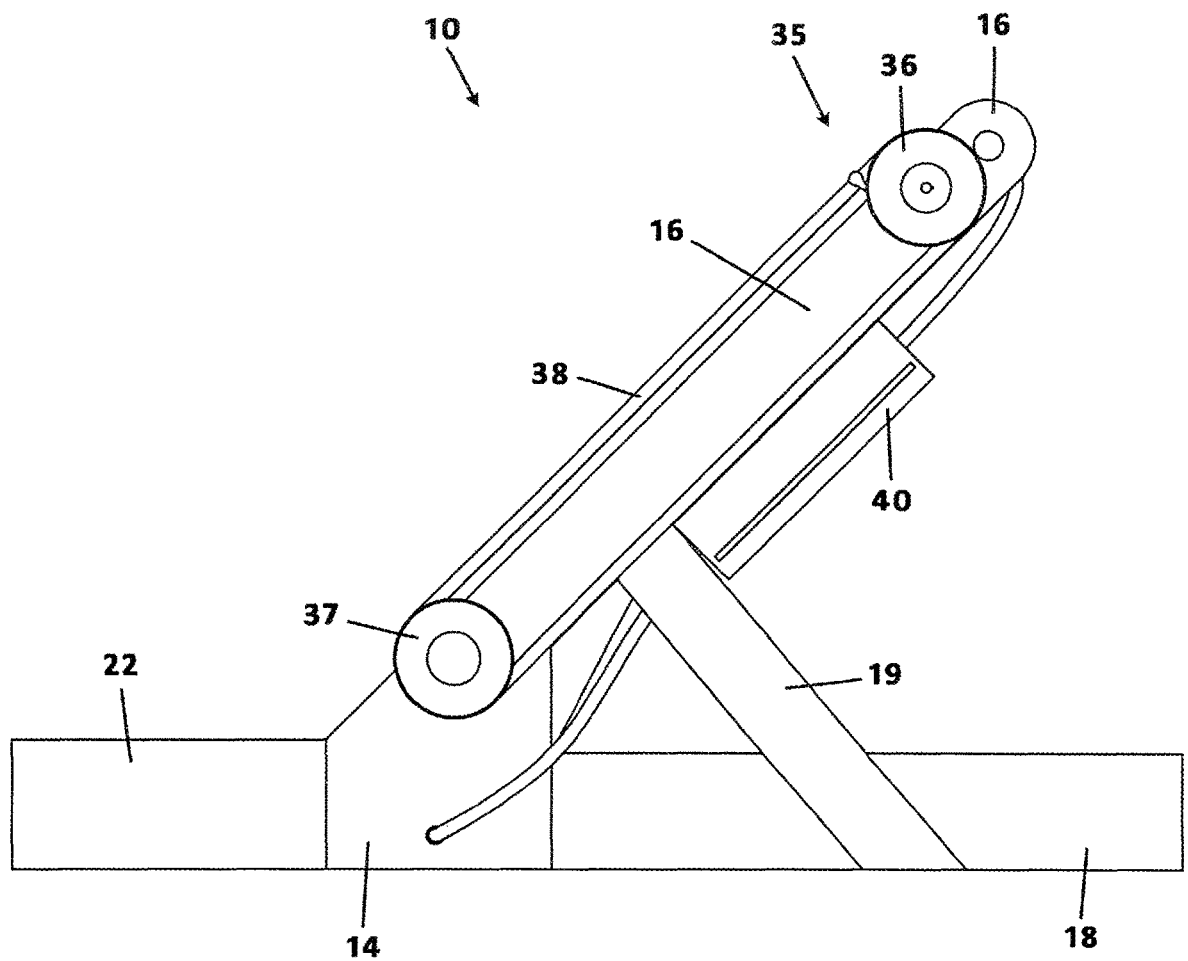
FIG. 6 is a side view of the plant growing apparatus as in FIG. 1.
Figure 7:
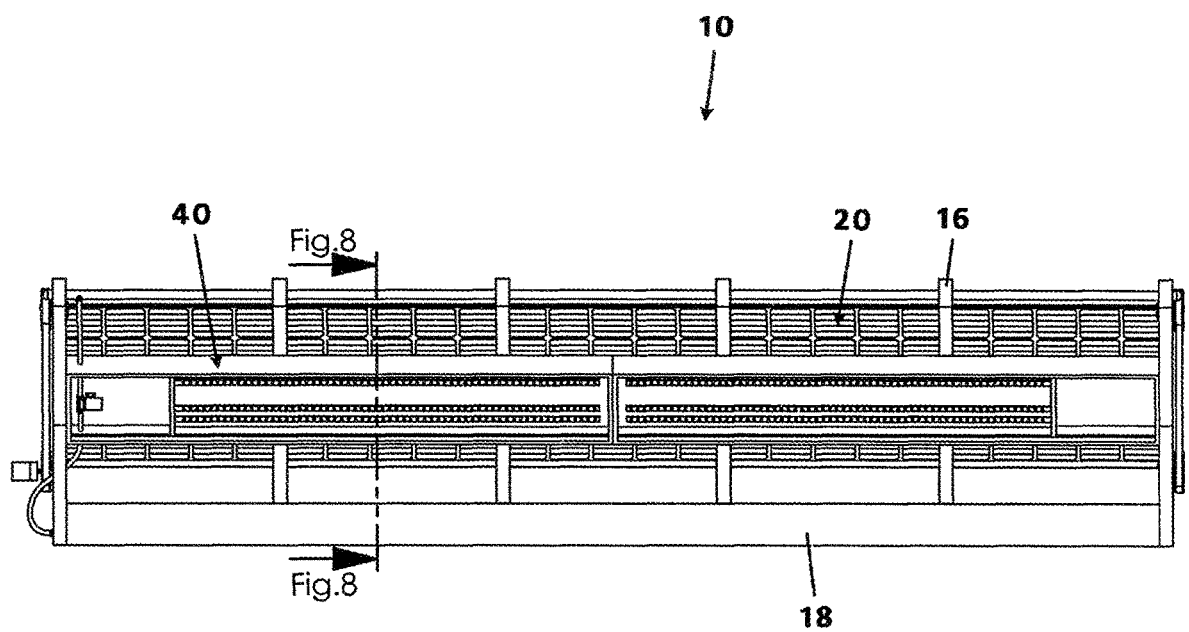
FIG. 7 is another rear perspective view of the plant growing apparatus as in FIG. 1.
Figure 8:
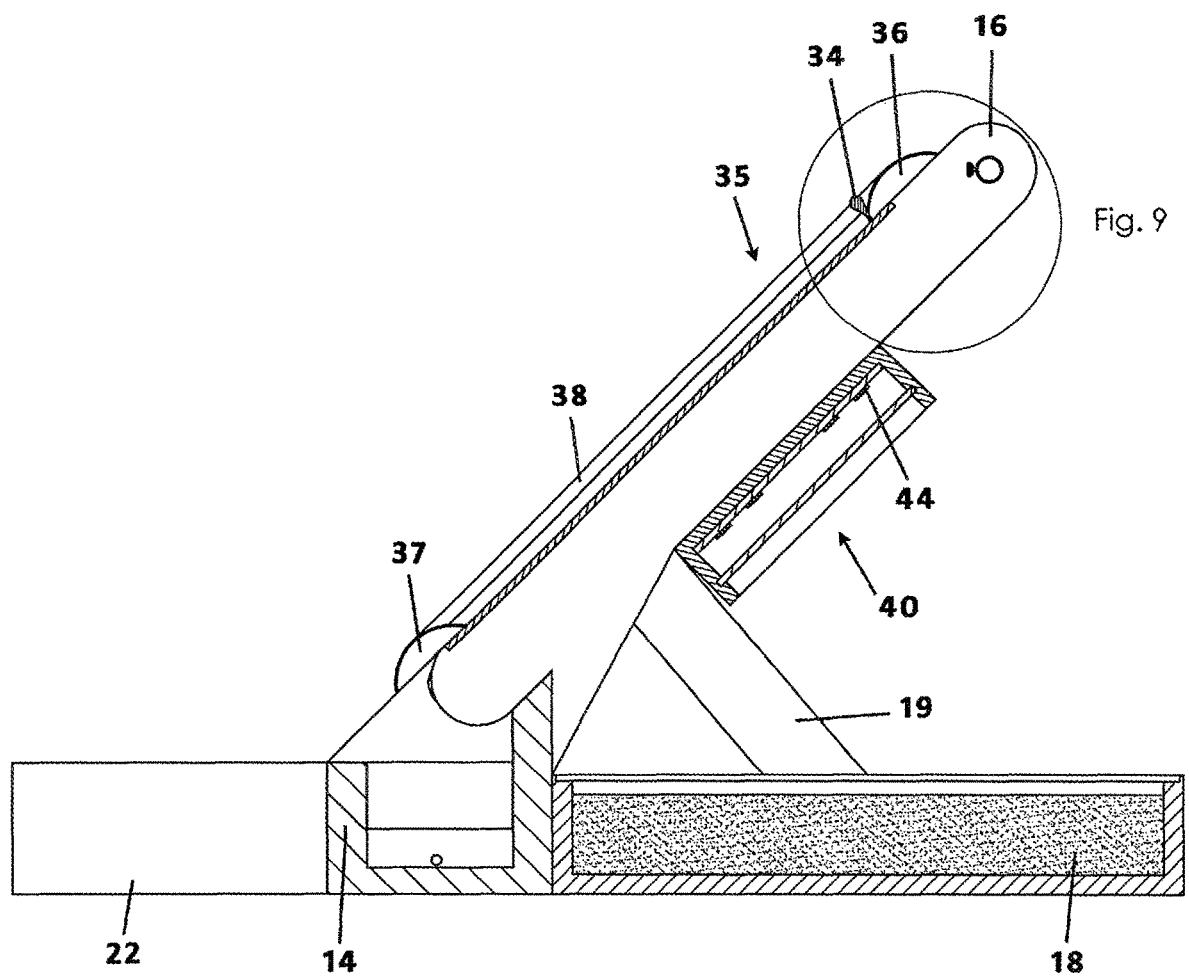
FIG. 8 is a sectional view taken along line 8-8 of FIG. 7
Figure 9:
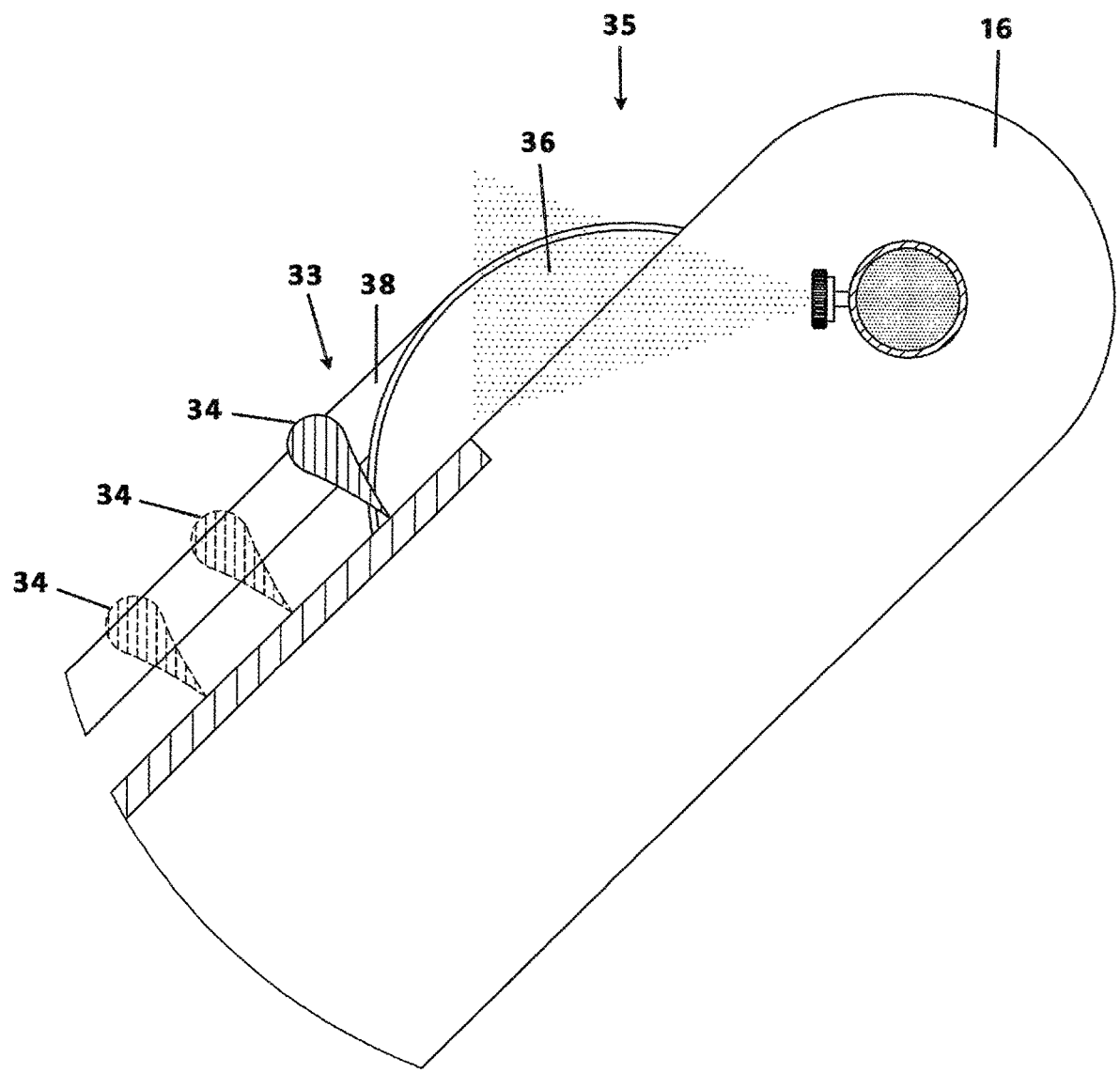
FIG. 9 is an isolated view on an enlarged scale taken from FIG. 8.
Figure 10:
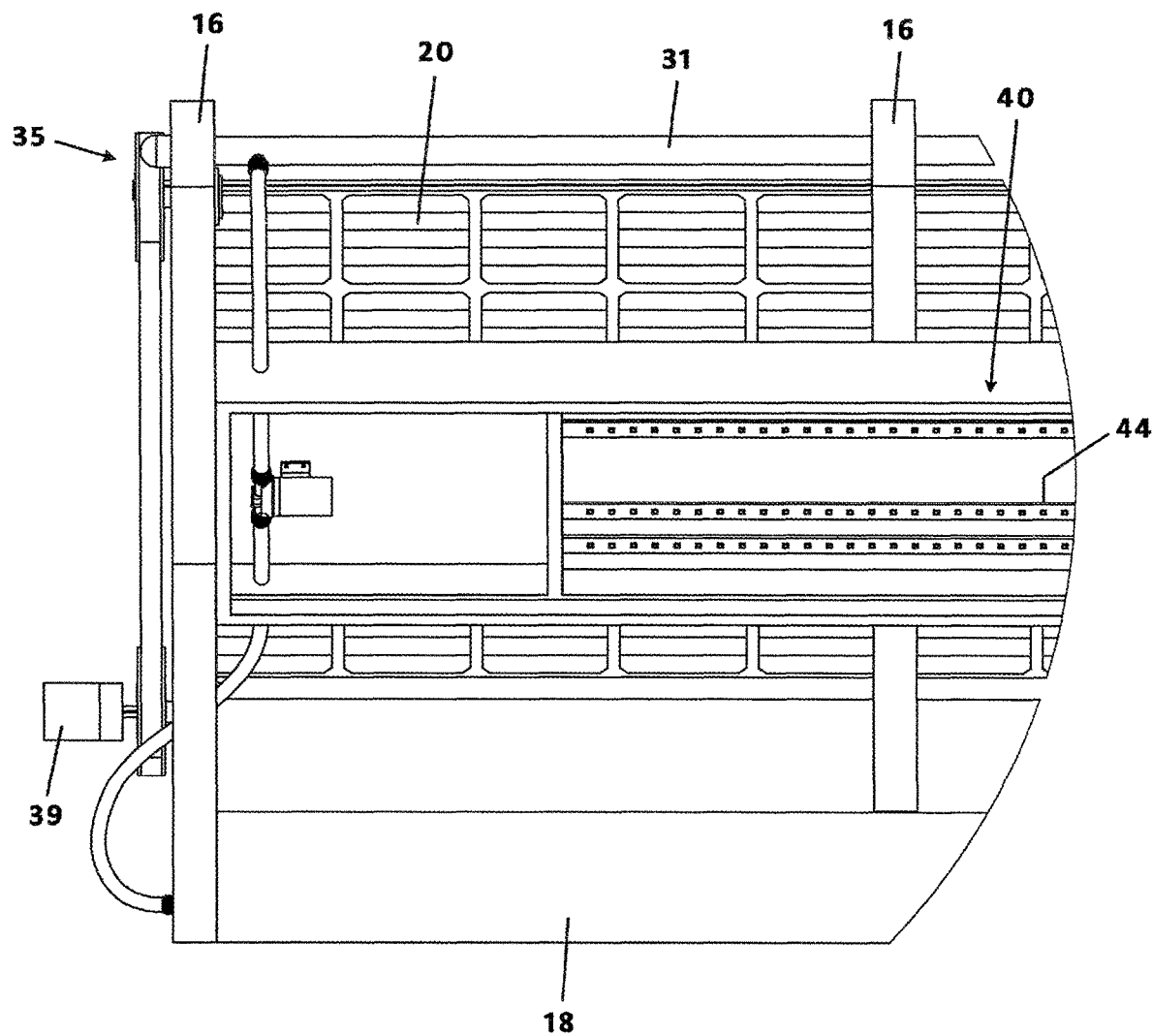
FIG. 10 is an isolated view on an enlarged scale taken from FIG. 7.
Figure 11:
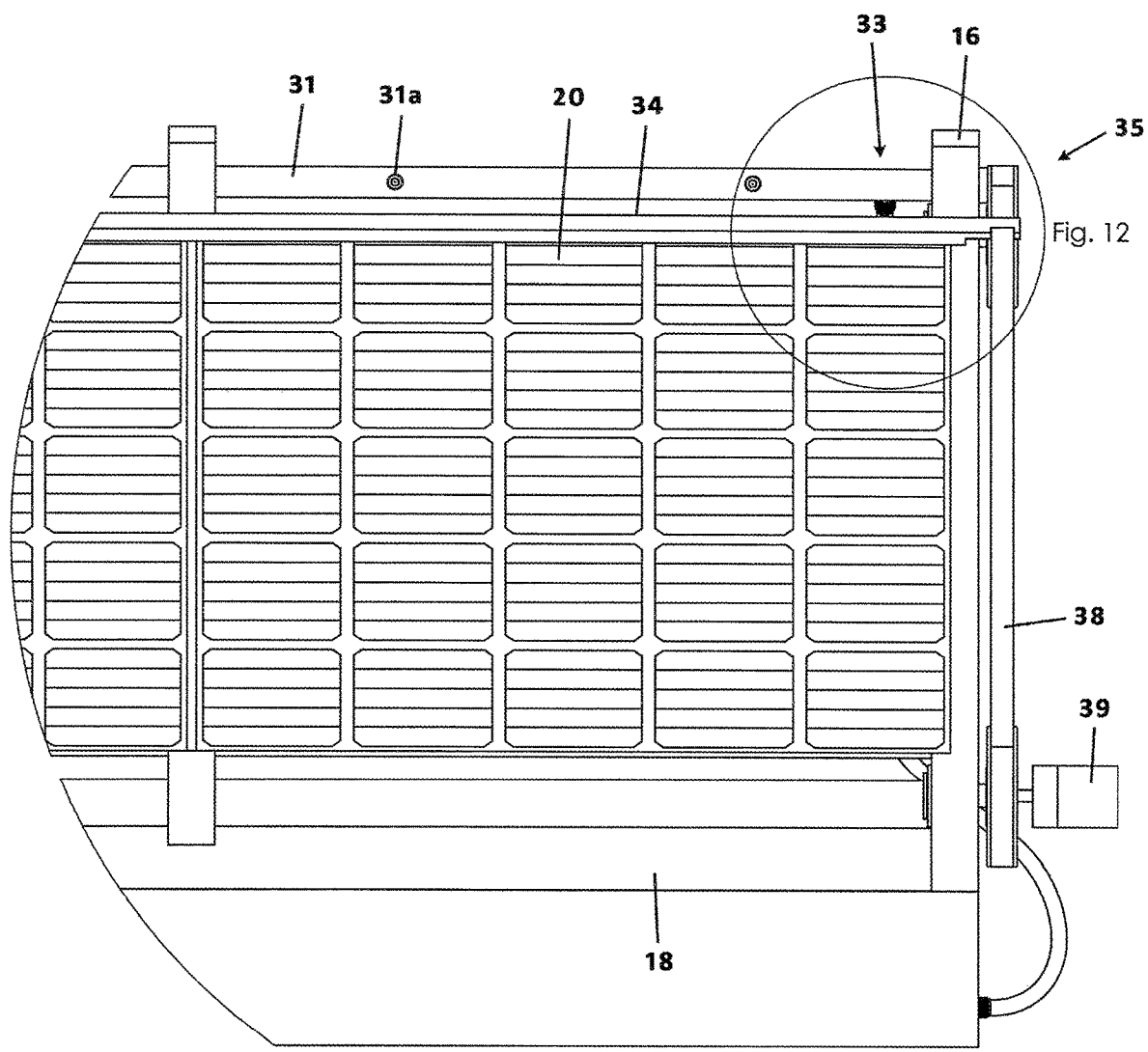
FIG. 11 is an isolated view on an enlarged scale taken from FIG. 1.
Figure 12:
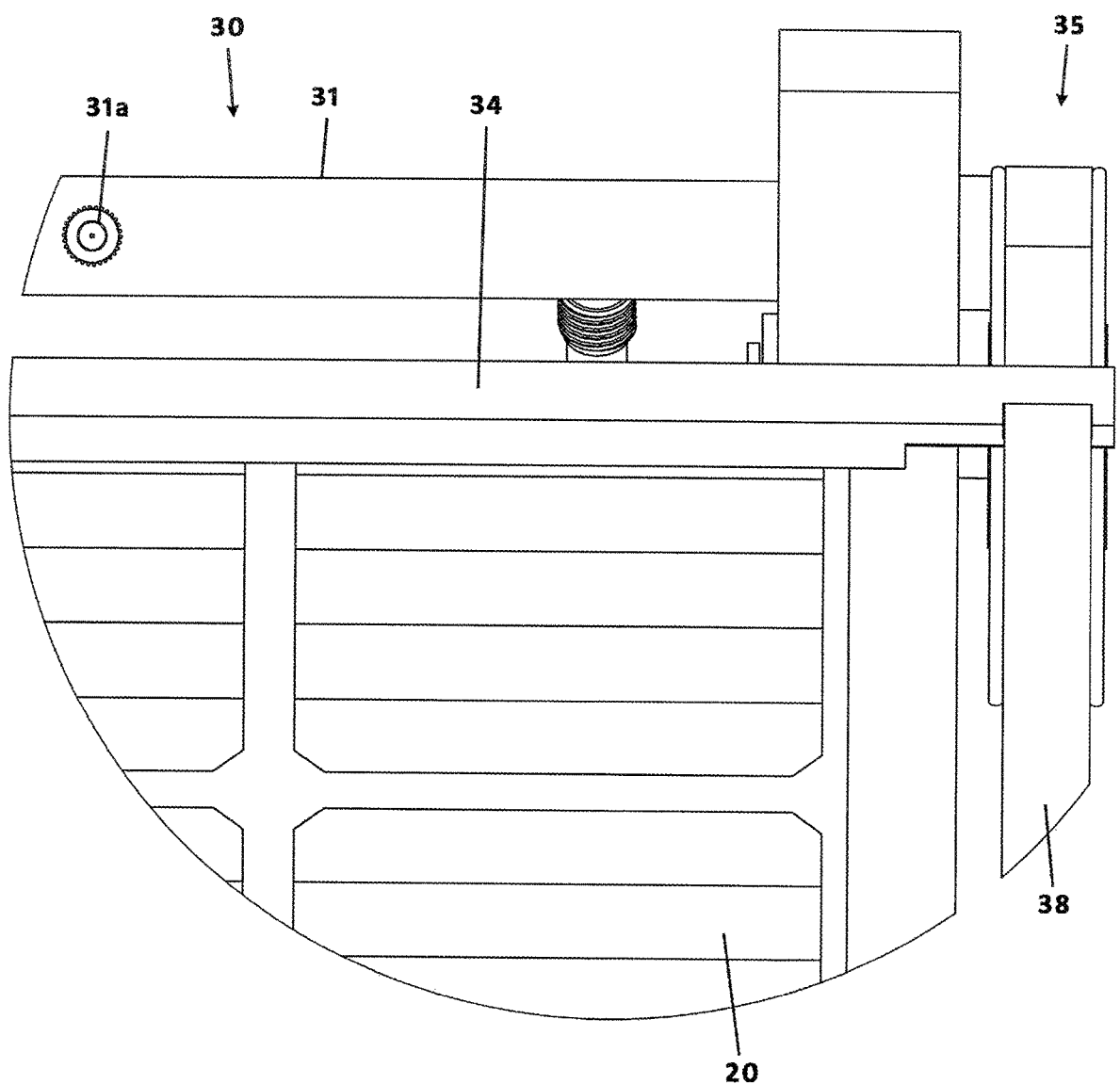
FIG. 12 is a an isolated view on an enlarged scale taken from FIG. 11.

The plant growing apparatus 10 may include a lighting cover 42 preferably constructed of Plexiglas™ acrylic material and may be desirable for cost, reduced weight, impact resistance, flexibility, and expansion/contraction during temperature fluctuation. Preferably the lighting cover 42 is transparent and is selectively removable. In some embodiments, a PV panel 20 may be constructed of polypropylene. A homopolymer polypropylene may be desired for strength and stiffness, durability, ease of forming, and higher heat resistance. A copolymer polypropylene may be desired for softness and durability, stress/crack resistance, flexibility, and impact toughness. Preferably, the lighting assembly 40 is pivotally coupled to an underside of the plurality of photovoltaic panels 20 and is movable pivotally to be operably directed toward the planting bed 18 (FIG. 6)

Figure 14:
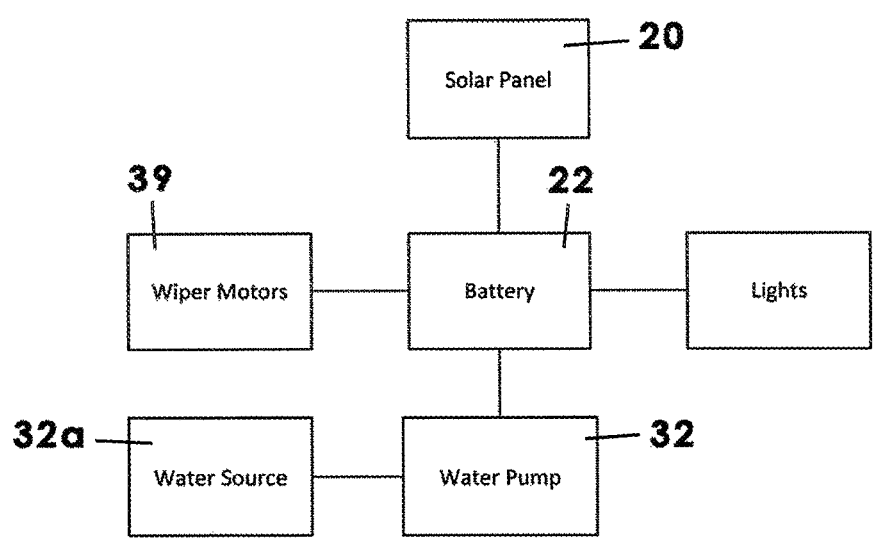
FIG. 14 is a block diagram of the electronic components of the plant growing apparatus according to the present invention.

The environmental system may further comprise a temperature control system and a watering assembly 30. The temperature control system may comprise a system of pulleys to open and close the PV panel like a lid. This would prevent the plants in the planting bed from over or under heating. Further, the watering assembly 30 may include a misting conduit 31 capable of watering the plants and, alternatively to cool off the PV panel to prevent overheating. The misting conduit 31 may define one or more holes 31a and be connected to a water pump 32 and a water supply 32a (also referred to as a water source) configured to push or spray water through the holes 31a and onto respective photovoltaic panels 20 and, eventually, onto the plants themselves growing in the plant bed (FIG. 14). It is understood that the entire watering assembly 30, including the pump 32, may be coupled in fluid communication with the water source 32a, as would be understood by a plumber or another person of ordinary skill in the art. Additionally, a wiper assembly 33 would keep the PV panel clean thereby increasing efficiency. A pulley system 35 and wiper blade 34 may be used to squeegee water off of the panels and redirect it through a trough for reuse in watering the plants in a drip system.

Now, in greater detail, the pulley system 35 may include pairs of reels operable to move the wiper blade 34 reciprocally so as to squeegee any buildup of water. In an embodiment, a first reel member 36 is operably coupled to a first end of the at least one photovoltaic panel 20. Similarly, a second reel member 37 is operably coupled to a second end of the at least one photovoltaic panel 20. A pulley cable 38 or belt having an elongate and continuous construction may extend between the reels. Then, a reel motor 39 is electrically connected to the first reel member 36 or second reel member 37 (or both) and operable to rotate the reels and, therefore, to operate the pulley cable 38 when electrically actuated (FIG. 2), such as via a switch, button, remote control signal, or other input means (not shown).

The wiper blade 34 may, in fact, include a plurality of wiper blades 34 distributed across the plurality of photovoltaic panels 20 as shown, each wiper blade 34 extending substantially across the width of a respective panel. Then, a respective wiper blade 34 may be continuously movable back and forth between first and second (e.g. upper and lower) ends of a respective PV panel 20 when the pulley system 35 is actuated.

The plant growing apparatus 10 may include a battery assembly 22 and an electrical system (FIG. 14). The electrical system may be housed within the planting bed 18 and connects the PV panel to the environmental system and the battery component, such as through electrical wires (not shown). Solar energy may be accumulated in the battery component and also used to power electrical components. The electrical system may comprise a relay switch. This will increase battery life as the battery assembly 22 will receive a constant recharge. The battery assembly may comprise two sets of batteries that rotate between front and back also increasing battery life.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A plant growing apparatus, comprising consisting of:
   a framework;
   a solar assembly coupled to said framework at a predetermined angle, said solar assembly including at least one photovoltaic panel operable to receive solar energy;
   a planting bed coupled to said framework;
   a lighting assembly electrically connected to said at least one photovoltaic panel and operably directed to emit light toward said planting bed;
   wherein said lighting assembly includes an interchangeable light coloring panel that produces light of a predetermined wavelength;
   a watering assembly having a misting conduit in fluid communication with a water source and positioned laterally or upwardly adjacent said at least one photovoltaic panel and defining an aperture;
   a water pump electrically connected to said misting conduit and operable, when actuated, to force water through said aperture initially onto said at least one photovoltaic panel and subsequently onto said planting bed;
   a wiper assembly operably coupled to said at least one photovoltaic panel, said wiper assembly including a pulley system and a wiper blade movable along said at least one photovoltaic panel when said pulley system is actuated.

2. The plant growing apparatus as in claim 1, wherein said framework includes:
   a mounting member having an elongate and linear configuration positioned along a ground surface; and
   a plurality of support members each having a first end coupled to said mounting member and spaced apart from one another, respectively, and extending away from said mounting member at said predetermined angle.

3. The plant growing apparatus as in claim 2, wherein at least one photovoltaic panel includes a plurality of photovoltaic panels coupled to said framework at said predetermined angle, each photovoltaic panel being coupled to adjacent support members of said plurality of support members.

4. The plant growing apparatus as in claim 3, wherein said framework includes a pair of auxiliary members each coupled to an outermost support member of said plurality of support members and each of said pair of auxiliary members being positioned at an angle different than said predetermined angle for operably supporting said at least one photovoltaic solar panel and positioned at adjacent ends of said planting bed.

5. The plant growing apparatus as in claim 1, wherein said pulley system includes:
   a first reel member operably coupled to a first end of said at least one photovoltaic panel;
   a second reel member operably coupled to a second end of said at least one photovoltaic panel;
   a reel motor electrically coupled to said first reel member; and
   a pulley cable having a continuous construction and movably extending between said first reel member and said second reel member and operable when said reel motor is actuated.

6. The plant growing apparatus as in claim 5, wherein said wiper blade is continuously movable back and forth between said first end and said second end of said at least one photovoltaic panel when said reel motor is actuated.

7. The plant growing apparatus as in claim 1, wherein said lighting assembly is pivotally coupled to a bottom side of said at least one photovoltaic panel.

8. The plant growing apparatus as in claim 1, wherein said light assembly includes a removable transparent cover.

* * * * *

UNITED STATES PATENT AND TRADEMARK OFFICE
CERTIFICATE OF CORRECTION

| | |
|---|---|
| PATENT NO. | : 11,337,379 B2 |
| APPLICATION NO. | : 16/397680 |
| DATED | : May 24, 2022 |
| INVENTOR(S) | : Tammy L. James |

It is certified that error appears in the above-identified patent and that said Letters Patent is hereby corrected as shown below:

On the Title Page

(71) Applicant: Tammy L. James, Broken Arrow, OK (US)
(72) Inventor: Tammy L. James, Broken Arrow, OK (US)

Should be:
(71) Applicant: Tammy L. James, Broken Bow, OK (US)
(72) Inventor: Tammy L. James, Broken Bow, OK (US)

Signed and Sealed this
Sixth Day of February, 2024

*Katherine Kelly Vidal*

Katherine Kelly Vidal
*Director of the United States Patent and Trademark Office*